United States Patent [19]

Hörger

[11] 3,872,024

[45] Mar. 18, 1975

[54] ENCAPSULATION PROCESS BY SIMPLE COACERVATION USING INORGANIC POLYMERS

[75] Inventor: Georg Hörger, Steppach, Germany

[73] Assignee: NCR Corporation, Dayton, Ohio

[22] Filed: May 27, 1970

[21] Appl. No.: 41,112

[52] U.S. Cl............ 252/316, 117/62.2, 117/100 A, 117/100 B, 264/4, 424/16, 424/32, 424/33, 424/37
[51] Int. Cl......................... B01j 13/02, B44d 1/02
[58] Field of Search..... 252/316; 117/100 A, 100 B; 424/16, 32, 33, 37; 264/4; 260/113

[56] References Cited
UNITED STATES PATENTS

| | | | |
|---|---|---|---|
| 2,800,458 | 7/1957 | Green | 252/316 |
| 3,016,308 | 1/1962 | Macauley | 252/316 X |
| 3,069,370 | 12/1962 | Jensen et al. | 252/316 X |
| 3,112,274 | 11/1963 | Morgenthaler et al. | 252/99 |
| 3,415,758 | 12/1968 | Powell et al. | 252/316 |

OTHER PUBLICATIONS
Van Wazer et al., Inorganic Polymers (1962), (Stone and Graham), p. 93.
Zimmerman et al., Handbook of Material Trade Names (1953), p. 104.

*Primary Examiner*—Richard D. Lovering
*Attorney, Agent, or Firm*—Robert J. Shafer; E. Frank McKinney

[57] ABSTRACT

A process is disclosed for liquid-liquid phase separation utilizing certain inorganic polymeric materials as phase-separation-inducing materials. The disclosed process is conducted in an aqueous liquid manufacturing vehicle and the material which emerges as a liquid phase is an aqueous solution comprising organic hydrophilic polymeric material. The liquid-liquid phase separation of this disclosure is of the type generally named "simple" coacervation wherein a major portion of the organic hydrophilic polymeric material is included in the separated, emergent, liquid phase and the phase-separation-inducing material is substantially evenly distributed, as to concentration, between the separated phase and the manufacturing vehicle. Preferred materials for use in practicing the present invention include gelatin as the organic hydrophilic polymeric material and polysilicates and polyphosphates as the inorganic polymeric phase-separation-inducing materials.

The liquid-liquid phase separation of the present invention is useful for, among other things, manufacturing, en masse, minute capsules having the organic and inorganic hydrophilic polymeric material as capsule wall material.

2 Claims, No Drawings

ENCAPSULATION PROCESS BY SIMPLE COACERVATION USING INORGANIC POLYMERS

BACKGROUND OF THE INVENTION

1. Field of the Invention

The present invention relates to a novel process for accomplishing a liquid-liquid phase separation having, as one major polymeric material constituent, an organic hydrophilic polymeric material. The present invention more specifically pertains to a process for manufacturing a separated liquid phase utilizing certain inorganic polymeric materials as phase-separation-inducing materials and further relates to a process for manufacturing, en masse, minute capsules having, as capsule wall material, the organic and inorganic hydrophilic polymeric material separated from solution. The present invention specifically pertains to a method for manufacturing such separated liquid phase and minute capsules wherein the liquid-liquid phase separation is of the type generally named "simple" coacervation and is conducted utilizing certain inorganic polymeric materials as phase-separation-inducing materials.

Minute capsules and coacervate films have long been manufactured by utilizing the effects of liquid-liquid phase separation. The capsule wall material and the material of the coacervate films made by liquid-liquid phase separation are subject to effects of moisture and humidity from an ambient environment;--such effects, for example, causing increased permeability where the quality of impermeability is generally desired. Moreover, capsules, capsule walls and coacervate film materials have been made in the past utilizing relatively expensive materials. Such capsules and coacervate films have been found to be too expensive to be used in many applications for which the benefits of capsules or coacervate films are desired. The process and the film and capsule product of the process of the present invention utilize relatively inexpensive materials and therefore produce relatively inexpensive capsules and films.

In separation of organic polymeric material from solution and in the manufacture of capsules and films wherein organic polymeric materials have been utilized both as capsule wall or film material and as phase-separation-inducing material, undesirable contaminant components have often been found resident in the capsule wall or film material of the product. Even in socalled "simple coacervation" wherein the major amount of capsule wall material has been a single kind of organic hydrophilic polymeric material, a considerable proportion of contaminant phase-separation-inducing material is present. In a well-known encapsulation process which utilizes simple coacervation, the phase-separation-inducing material is simple inorganic salt and the organic hydrophilic polymeric material, which serves as a major capsule wall component, is "salted out" of solution. The inorganic salt is present in finished capsule wall materials as a contaminant and the salt is believed to detract from the overall quality of capsule walls manufactured by that process. It is now possible, by the process of the present invention, to manufacture capsules and coacervate films by a process of simple coacervation wherein the residual, inorganic, phase-separation-inducing material is not a contaminant; but serves as an additional, beneficial, component in the capsule walls and improves qualities of the capsule. The inorganic material above-referenced, is an inorganic polymeric material which is soluble in an aqueous liquid manufacturing vehicle and which is utilized, according to the process of the present invention, as a phase-separation-inducing material. Said inorganic polymeric material remains in capsule walls and films manufactured by the simple coacervation of the present invention but, by a mechanism not well understood, improves the quality of capsule walls and films so manufactured by increasing desirable impermeability to diffusion of capsule contents through the capsule wall.

2. Description of the Prior Art

U.S. Pat. No. Re. 24,899 issued on Nov. 29, 1960 on the application of Barrett K. Green and assigned to the assignee herein discloses that organic hydrophilic polymeric material can be caused to undergo simple coacervation from aqueous solution by the addition, to that solution, of an inorganic salt such as ammonium sulfate. That patent discloses a method for making microscopic capsules having walls of gelable hydrophilic polymeric material. There is mention, in that patent, of removing undesirable residual salt from the phase-separated organic hydrophilic polymeric material by washing the polymeric material after it has undergone phase separation, but there is no mention of a use of inorganic polymeric material as a phase-separationinducing material.

A textbook titled "Colloid Science II," edited by H. R. Kruyt, and published by the Elsevier Publishing Company, New York (1949), contains extensive disclosure of liquid-liquid phase separation (simple coacervation) and yet does not mention simple coacervation by the use of inorganic polymeric materials. The textbook, Colloid Science II, also discloses the existence of residual inorganic salt in phase-separated hydrophilic polymeric material which, when dried into films of coacervate will be retained as a contaminant to the film.

Several other patents in the prior art, such as British Pat. No. 920,868 granted on the declaration of The National Cash Register Company, Mar. 13, 1963, disclose phase separation processes by simple coacervation techniques wherein simple inorganic salts are utilized to accomplish the liquid-liquid phase separation. In that particular British patent, ammonium sulfate is utilized as the phase-separation-inducing material to accomplish liquid-liquid phase separation of a pigskin gelatin from aqueous solution.

U.S. Pat. No. 2,800,457, issued July 23, 1957 on the application of Barrett K. Green and Lowell Schleicher and assigned to the assignee herein, discloses that organic hydrophilic polymeric materials can be caused to emerge from solution in aqueous manufacturing vehicles by being complexed with another hydrophilic polymeric material to decrease the collective solubilities of the polymeric materials in the manufacturing vehicle. Such emergence is named "complex" coacervation. In the process of that patent, the emergent phase includes the major portion of both the organic hydrophilic polymeric material to be separated from solution and the phase-separation-inducing material. The aqueous liquid manufacturing vehicle which is sometimes named "equilibrium liquid" contains little of either of the hydrophilic polymeric materials. The process of that patent does not closely relate to the process of the present invention and it is referenced here only to more completely differentiate between complex coacervation and the novel and improved simple coacervation of the present invention.

SUMMARY OF THE INVENTION

"Simple coacervation," as understood up to now in connection with coacervation using organic polymers, includes a process wherein a single kind of hydrophilic polymeric material is caused to emerge from aqueous solution as a separate liquid phase by addition, to the system, of some phase-separation-inducing material. The emergent phase contains a relatively high concentration of the hydrophilic polymeric material and the phase-separation-inducing material is substantially evenly distributed between the emergent phase and the remaining cointinuous phase (equilibrium liquid).

"Complex coacervation" includes a process wherein at least two oppositely electrically charged hydrophilic polymeric materials complexed with one another and by, thereby, having their solubility in the aqueous manufacturing vehicle decreased. In the case of complex coacervation, the emergent phase contains substantially all of both hydrophilic polymeric materials utilized in forming the complex.

The process of the present invention specifically pertains to a kind of simple coacervation, as above-defined, and, hereinafter, when liquid-liquid phase separation is mentioned, such mention will relate to that simple coacervation. Simple coacervation, as defined above, and as is known in the prior art, is utilized in the process of the present invention, although the simple coacervation of the present invention is of a novel type. As has been mentioned, simple coacervation, when performed by processes disclosed in the prior art, utilizes inorganic salts of a simple nature as phase-separation-inducing materials. The salts which have been used to cause simple coacervation have been required to be used in relatively high concentrations and they remain in high concentration in the separated phase as well as in the equilibrium liquid and form a contaminant to the polymeric material of the separated phase In preparing coacervate films and capsule walls, such salt contamination is believed to affect the permeability of the manufactured films. Moreover, such simple salt contaminants are believed to give rise to humidity and moisture sensitivity.

Simple coacervation of the present invention and of the prior art, however, provides some advantages over complex coacervation of the prior art. Even though high quality gelatins are customarily used in both types of coacervation, simple coacervation permits use of relatively inexpensive inorganic salts as phase-separation-inducing materials while to practice complex coacervation, relatively expensive complexing polymeric materials such as gum arabic or carrageenan have normally been required. Moreover, simple coacervation offers additional flexibility of operation over the process of complex coacervation because simple coacervation is relatively independent of pH of the aqueous manufacturing vehicle as compared with complex coacervation which is very sensitive to even small changes in pH.

With respect to conditions foir capsule manufacturing systems utilizing either simple or complex coacervation, the following ratios and ranges have been found to be useful as an intial guide in characterizing particular manufacturing systems. the systems can be divided into solids content and ratio of organic polymeric material to inorganic polymeric material. In a system utilizing gelatin, for example, as the organic polymeric capsule wall material, the weight ratio of organic solid material to inorganic solid material is usually less than about 2 and preferably less than about 1 in simple coacervation and is usually greater than about 2 and preferably in a range of about 2 to 22, or perhaps slightly larger, for the case of complex concervation.

It has now been discovered that the difficulties found in practicing simple coacervation can be alleviated while retaining the formerly recognized benefits and, additionally, realizing new benefits. The present invention particularly relates to a process for manufacturing, en masse, minute capsules and the above-mentioned old benefits and additional benefits realized in the novel process utilizing simple coacervation are realized in the practice of the present invention.

Accordingly, it is an object of the present invention to provide a process for performing simple coacervation of organic hydrophilic polymeric material utilizing an inorganic polymer as the phase-separation-inducing material. It is an additional object of the present invention to provide a process for manufacturing, en masse, minute capsules utilizing the above-described simple coacervation process and inorganic polymeric phase-separation-inducing material.

It is another object of the present invention to provide minute capsules having improved impermeability, decreased sensitivity to moisture and humidity of ambient conditions and utilizing less expensive phase-separation-inducing material. Another object of the present invention is to provide a process for making capsules by utilizing simple coacervation wherein the organic hydrophilic polymeric material can be of a lower quality and therefore less expensive than such hydrophilic polymeric materials used in the past.

It is important to note, and should be understood, that the process of the present invention pertains to simple coacervation. In this process for accomplishing simple coacervation, the inorganic material present in capsule walls is polymeric in nature and does not adversely affect either the film or the capsule wall properties. Inorganic polymeric material present in the emergent phase of organic hydrophilic polymeric material of the present invention has been found to actually improve the quality of films and capsule walls manufactured according to the invention.

The process of the present invention can be summarized, generally as follows:

a. organic hydrophilic polymeric material to be utilized in the process of the present invention by virtue of its being a major polymeric material constituent of a separated liquid phase, is dissolved in a liquid manufacturing vehicle to yield a solution; and b. phase-separation-inducing material is added to the solution of (a) in an amount sufficient to cause liquid-liquid phase separation wherein the organic hyduid-liquid phase separation wherein the organic hydrophilic polymeric material emerges from solution and forms a separated liquid phase which is relatively concentrated in that organic hydrophilic polymeric material and which also contains an amount of the phase-separation-inducing material.

The process of the present invention when used to make capsules, can be summarized, generally, as follows:

a. preparing a liquid capsule manufacturing system by mixing an aqueous solution of organic hydrophilic polymeric material with an aqueous solution of inorganic hydrophilic polymeric material-- the mixture yielding a two-phase system comprising a continuous liquid phase relatively dilute in the organic hydrophilic material and discontinuous, coacervate, phase of a multitude of dispersed droplets of an emergent phase relatively concentrated in the organic hydrophilic material and containing an amount of the inorganic hydrophilic polymeric material;

b. dispersing into the capsule manufacturing system a multitude of minute, intended capsule core entities; and c. maintaining the system for a time adequate to permit the dispersed intended capsule core entities to be wet and enwrapped by the emergent droplets of the coacervate phase.

It should be pointed out that all of the components of the capsule manufacturing system including the intended capsule internal phase can be combined into a single vessel, aqueous liquid added to yield solution of the soluble components, and agitation continued to make the capsules, in one continuous step. Such a system can be considered to be a "pre-mix" of an encapsulation system. It should be understood that the intended capsule core material must be substantially insoluble in the capsule manufacturing vehicle and it should be further understood that the capsule product of the novel encapsulating system is obtained when the dispersed capsule core entities have been wet and individually enwrapped by the emergent liquid phase. Such capsules can then be considered to be embryonic, liquid-walled, capsules and can, optionally, be subjected to further treatment in which the enwrapping capsule wall material is further hardened. The additional treatment can comprise simple lowering of the temperature to gel gelable capsule wall material or addition of chemical reactants to chemically harden the capsule wall material or any of several other capsule wall material hardening treatments known to those skilled in the art.

A special feature of the process and product of the present invention resides in the use of certain inorganic polymeric materials as liquid-liquid phase-separation-inducing materials in causing simple coacervation of an organic hydrophilic polymeric material.

Organic hydrophilic polymeric materials which are generally eligible for use in the practice of the present invention include any film-forming polymeric material soluble in the aqueous liquid of a liquid phase separation manufacturing vehicle. Among such organic hydrophilic polymeric materials can be listed: gelatin; gum arabic; poly(ethylene-co-maleic anhydride); poly-(vinylmethylether-co-maleic anhydride poly(vinyl pyrrolidone); poly(vinyl alcohol); poly(ethyleneimine); poly(vinyl imidazol); poly(methylvinyl pyridine); albumin; alginates; casein; agar-agar; starch; pectins; carboxymethylcellulose; poly-ethylene oxide); carrageenan; and zein, to mention representative examples.

Inorganic polymeric materials which are eligible for use in the practice of the present invention generally include any such polymeric material or material which forms polymeric chains at least in a transitional state, which materials are soluble, in sufficient quantity, in the aqueous liquid of the phase separation manufacturing vehicle. Preferred, among the eligible inorganic polymeric materials, ae polyphosphate materials and polysilicate materials. Specific examples of those inorganic polymeric materials include alkali salt polyphosphates such as sodium polymetaphosphates, potassium polymetaphosphates, sodium and potassium metasilicates and, as additional polysilicate materials, water glasses of many varieties with varying ratios of alkali oxide-to-$SiO_2$(silicate). Alkali oxide/silicate ratios of eligible water glasses can range from 1 to 5, by weight;—1 to 2, by weight, being preferred. Other inorganic polymeric materials which are eligible for use include water soluble polymolybdates and polytungstates.

Solvents eligible for use in the practice of the present invention, as manufacturing vehicle liquid, are polar liquids having relatively high dielectric constants. The prefered solvent is water, but mixtures of water and a second liquid can be employed, such as mixtures of water with alcohol, water with acetone, or generallly, mixtures of water and another organic liquid solvent wholly or partially miscible with water. The percentage of additional organic liquid solvent utilized with water in the process of the present invention must be of an amount such that the combination of water and the additional organic solvents will still exhibit adequate dissolving power with respect to the polymeric materials. One reason for utilizing additional organic solvents in the present invention is that the additional solvent permits alteration of the viscosity of the emergent liquid phase. Alteration of the viscosity of the emergent liquid phase in this way, permits the use of a wider variety of coacervate film materials and permits an additional control in the size of capsules manufactured by the present process.

When capsules are manufactured by the process of the present invention, the materials contained within the confines of the capsule walls;—that is, the capsule internal phase material--can be any of a multitude of different kinds and types of materials. The most important criteria in selection of the materials which are eligible for use as the internal phase of capsules are: (a) that the intended internal phase material be substantially insoluble in the capsule manufacturing vehicle and (b) that the intended capsule internal phase material usually be substantially nonreactive with other components of the capsule or coacervate film manufacturing system. A few of the materials which can be utilized as capsule internal phases include, among a multitude of others: water insoluble or substantially water insoluble liquids, such as olive oil, fish oils, vegetable oils, sperm oil, mineral oil, xylene, toluene, benzene, kerosene, chlorinated biphenyl, and methyl salicylate; substantially water insoluble metallic oxides and salts; fibrous materials, such as cellulose or asbestos; substantially water insoluble synthetic polymeric materials; minerals; pigments; glasses; elemental materials, including solids, liquids and gases; flavors, fragrances; reactants; biocidal compositions; physiological compositions; fertilizer compositions, and the like. In short, the materials which can be contained in capsules manufactured by the process of the present invention, can differ not only among themselves in their physical state, which can be solid, liquid, gas, or combinations thereof, but can differ in their chemical composition and in their intended use. The coacervate films utilized as capsule wall materials in the present invention provide protection for the capsule internal phase materials, such as, protection from ambient conditions, protection from oxidation or ultraviolet radiation, protection from evaporation, from crystallization in solution, and the like.

The coacervate films, whether used as capsule wall materials or not, once formed, can be hardened by gelling (that is, by lowering the temperature) or can be hardened by chemical reaction or complexing. The chemical hardening or complexing can be achieved by relatively well-known hardening agents for the organic hydrophilic polymeric material. Such hardening agent eligible for use include formaldehyde, glutaraldehyde, acroleine, glyoxal, cinnamaldehyde, tannin, and several others exhibiting like effect on the organic polymeric material, either in solution or in aqueous contact. Of course, the coacervate films can be used without chemical hardening or complexing, simply by lowering the temperature to gel the polymeric material.

Capsules made according to the process of the present invention are substantially spherical, have seamless walls, and are not limited either as to size or as to internal phase contents. The broad range of internal phase contents was hereinabove disclosed and the size range of capsules made by the present invention can extend from a lower limit of a few to several microns up to a larger limit of several thousand microns in average diameter. The usual size for capsules made according to the present process are from about one or two microns to about 15,000 microns in average diameter. Capsules of the aforementioned size are considered to be minute and are preferred. The most usual size for capsules manufactured according to the present invention is within a range of from about five microns up to about 2,500 microns. Capsules made according to the present invention can be made to contain a range of amounts of internal phase material. The capsules can contain from 0 to more than 99 percent, by weight, of the internal phase material. The most usual and preferred range for the amount of material to be contained in capsules manufactured according to the present invention is from about 50 to about 97 percent, by weight. The aforementioned capsules having zero contents are considered to be minute spheres of polymeric material and can be manufactured by the process of the present invention by omitting the intended internal phase material.

Because the process involves simple coacervation and does not depend upon the electrical charge of organic hydrophilic polymeric materials, a wide range of operating temperatures and operating pH's can be utilized in practicing the present invention. Although the process is effected by changes in pH, it is substantially independent of temperature and pH effects except as they relate to solubility of the various polymeric materials and solubility of the intended internal phase material.

DESCRIPTION OF PREFERRED EMBODIMENTS

EXAMPLE 1

Into a vessel having a volume of approximately one liter and equipped for agitating and heating, there are added 150 milliliters of 11 percent, by weight, aqueous gelatin solution having a temperature of approximately 80° centigrade. The gelatin is acid-extracted pigskin gelatin having a Bloom strength of approximately 285 to 305 grams and an isoelectric point of about pH 8–9. Also added to the vessel are 100 milliliters of water and 160 milliliters of 25 percent, by weight aqueous polyphosphate solution. The polyphosphate material of this example is known, also, as sodium hexametaphosphate such as is sold by Benckiser G.m.b.H., Ludwigshafen Rhine, Germany, under the tradename "Calgon" and containg about 67 percent, by weight, $P_2O_5$ minimum. The pH of the mixture of gelatin and polymeric polyphosphate solution is then adjusted to approximately 6.8, agitation is commenced and the agitating system is permitted to cool, that is, the heat source is turned off.

The intended internal phase material for the present example is toluene; and 100 milliliters of that liquid is added to the agitating system when the temperature of the system is approximately 40 degrees centigrade. At the time of addition of the toluene, liquid-liquid phase separation has already occurred and an emerged liquid phase relatively richk in gelatin solution has been evenly dispersed in the form of minute globules throughout a continuous phase of the polyphosphate solution. The emergent gelatin-rich solution wets and enwraps individual minute particles of the toluene to form embryonic capsules and the embryonic capsules continue to form and develop as the system is permitted to cool to approximately 25° centigrade. The system is then chilled with ice to a temperature of approximately 10° centigrade and 5 milliliters of 25 percent, by weight, of glutaraldehyde is added to the agitating system to chemically cross-link and harden the gelatin-containing capsule walls. After further stirring for some hours, the capsule manufacturing system is then filtered to separate the capsules from the manufacturing vehicle, the separated capsules are washed with water and the capsule walls are dried by conventional means utilizing a forced air blower.

The resultant, minute, hard-walled capsules are found to be highly impermeable.

EXAMPLE 2

This example also uses gelatin, as described above, as the major capsule material component and also uses polyphosphate material, as described above, as the phase-separation-inducing material.

Into a vessel equipped for agitation and heating are placed 250 grams of a 10 percent, by weight, aqueous solution of the gelatin, 210 grams of water and 320 grams of a 25 percent, by weight, aqueous solution of the polyphosphate material. The pH of the agitating system is adjusted to about 6.8 and the system is heated to approximately 60° centigrade. The intended capsule internal phase for this example is perchloroethylene, and 250 grams of that material is added to the gelatin-polyphosphate system. The rate of agitation is adjusted to obtain dispersed particles of the perchloroethylene having an approximate size of about 100 to 600 microns in average diameter. The system is permitted to cool to approximately 25° centigrade while maintaining the agitation, to yield liquid walled embryonic capsules.

At approximately 25° centigrade, the system is chilled, by direct addition of ice, to approximately 5 degrees centigrade, at which time are added 10 grams of 25 percent, by weight, aqueous glutaraldehyde solution and 100 grams of an aqueous solution containing 10 grams of $KCr(SO_4)_2 \cdot 12H_2O$ (Chromium-(III)-alum) and 3 grams of $Na_2CO_3 \cdot 10H_2O$ (Soda). The glutaraldehyde and alum/soda solutions are added to the capsule-containing system in order to effect chemical hardening of the capsule wall material.

The above system of capsules is permitted to stand for about 12 hours, whereupon the capsules are separated from the manufacturing vehicle by filtering, the separated capsules are rinsed with a 20 percent, by weight, aqueous sodium sulfate solution, and the resulting filter cake is dried on a forced air blower. The resulting, substantially spherical, hard-walled capsules exhibit a high degree of impermeability.

EXAMPLE 3

This example utilizes a capsule manufacturing vehicle comprising a solution of water and ethyl alcohol. The following solutions are mixed together and warmed to a temperature of approximately 60 degrees centigrade:
  250 grams of 10 percent, by weight, aqueous gelatin solution (the gelatin as above-identified)
  210 grams of water
  340 grams of 25 percent, by weight, aqueous polyphosphate solution (the polyphosphate as above-identified)
  30 grams of ethyl alcohol.

The intended internal phase material for this example is perchloroethylene and 250 grams of the internal phase material is utilized. The internal phase material is added to the above-described solution and the agitation is adjusted to provide dispersed particles of the intended internal phase having a size range of about 10 to 200 microns in average diameter. The system is permitted to cool to approximately 25° centigrade and is then chilled, using ice, to approximately 5° centigrade. At that time, 300 milliliters of 20 percent, by weight, aqueous sodium sulfate solution are added to shrink the walls. Thereupon, 20 milliliters of a 25 percent, by weight, aqueous glutaraldehyde solution are added to effect capsule walld material cross-linking.

The capsules are permitted to steep in the system for approximately 12 hours, are then washed twice, using 200-milliliter portions of 20 percent, by weight, aqueous sodium sulfate solution wherein the capsules are agitated in the solution, permitted to settle, and the solution is decanted toi be replaced by another portion of the sodium sulfate solution. The capsules are then filtered and the filter cake is dried in a forced air blower.

The resulting capsules exhibit qualities much like the capsules of Examples 1 and 2, above.

EXAMPLE 4

This example utilizes a sodium silicate (water glass) solution as the inorganic polymeric liquid-liquid phase-separation-inducing material. Into a vessel having a volume of approximately 2 liters and equipped for agitation and heating, are placed 200 milliliters of 11 percent, by weight, aqueous gelatin solution having a temperature of approximately 55 degrees centigrade. The gelatin utilized herein is of the same kind and quality utilized in the examples above. Also added, are 200 milliliters of water and 160 milliliters of 50 percent, by weight, of the aqueous sodium silicate solution (water glass) having a density of 28°–30°Baume. The temperature of the system after the above additions is approximately 40° centigrade, and the pH is found to be about 11.32.

The intended internal phase material for this example is toluene and 150 milliliters are used. The toluene is added to the system and the rate of agitation is adjusted to obtain dispersed droplets of toluene having the desired size. The coacervate wets and enwraps dispersed toluene droplets to yield embryonic capsules. The system is stirred and permitted to cool to approximately 29° centigrade, at which time 800 milliliters of a saturated aqueous solution of sodium sulfate is slowly added to the capsule manufacturing system. Chemical hardening of the capsule wall material is accomplished by addition of 10 milliliters of 37 percent, by weight, aqueous formaldehyde solution and agitation of the system is continued for more than 5 minutes.

Capsules are separated from the capsule manufacturing vehicle by being filtered and the filter cake is dispersed in 400 milliliters of saturated aqueous sodium sulfate solution. The capsules are filtered again and capsules in the resulting filter cake are dried by being placed on a forced air blower.

It should be understood that many kinds and types of water glass have been successfully employed in the process of the present invention. The water glasses or potassium or sodium silicate solutions can either be obtained commercially or prepared in the laboratory and can range in concentration from less than 28° Baume to more than 60° Baume, equivalent, and can have a solid content of less than 28 percent, by weight, to more than 55 percent, by weight. Both sodium water glass and potassium water glass have been successfully utilized in the coacervation of gelatin in water glass concentrations of approximately 28° Baume, 35° Baume, 40° Baume and 54° Baume. Examples of commermcially available water glasses include materials sold under the tradenames of "Portil N" (sodium silicate) and "Portil K" (potassium silicate), sold by Henkel & Cie., Dusseldorf, Germany.

EXAMPLE 5

This example and the following three examples utilize sodium polyphosphates of a variety of molecular weights as the liquid-liquid phase-separation-inducing materials. Combined in a vessel equipped for agitation and heating are: 100 milliliters of 10 percent, by weight, aqueous gelatin solution having a temperature of 80° centigrade, 100 milliliters of water, 120 milliliters of 25 percent, by weight, aqueous polyphosphate solution (low molecular weight material as sold under the tradename "Hexatren N" by Gebr. Giulini G.m.b.H., 6700 Ludwigshafen/Rhein, Giulinistr. 2, Germany). The pH is adjusted to about 7.28 and the temperature is adjusted to about 41° centigrade. Agitation is commenced and 100 milliliters of toluene, the intended capsule internal phase material for this example, is added to the above-prepared capsule manufacturing system. The toluene is dispersed to obtain a desired droplet size. The system is permitted to cool to approximately 25° centigrade and the system is then chilled to approximately 10° centigrade. To chemically harden the capsule wall material, 5 milliliters of 37 percent, by weight aqueous formaldehyde solution is added to the system. The capsules are separated from the system and dried according to the procedures described hereinabove.

EXAMPLE 6

In this example, the following are combined: 100 milliliters of 10 percent, by weight, aqueous gelatin solution having a temperature of approximately 80° centigrade; 100 milliliters of water and 210 milliliters of 25 percent, by weight, aqueous solution of polyphosphate polymeric material (medium molecular weight material as sold under the tradename "Hexatren R," by Gebr.

Giulini G.m.b.H.). The pH of the system is adjusted to about 6.2, the temperature is adjusted to about 34° centigrade and 100 milliliters of toluene is dispersed in the system as the intended internal phase material. The system is permitted to cool to about 25° centigrade and is then chilled to approximately 10 degrees centigrade. In order to chemically harden and cross-link the capsule wall material, 5 milliliters of 37 percent, by weight, aqueous formaldehyde solution and 5 milliliters of 25 percent, by weight, aqueous glutaraldehyde solution is added to the agitating capsule-containing system.

EXAMPLE 7

The following are added to a vessel equipped for agitation and heating: 100 milliliters of 10 percent, by weight, aqueous gelatin solution having a temperature of approximately 80° centigrade; 100 milliliters of water and 240 milliliters, 25 percent, by weight, aqueous solution of polyphosphate polymeric material (high molecular weight such material as sold under the tradename "Hexatren C-60" by Gebr. Giulini G.m.b.H.). The pH of the system is adjusted to about 5.8 and the temperature is adjusted to about 37° centigrade. One hundred (100) milliliters of toluene, the intended internal phase material for this example, is dispersed into the system and the system is permitted to cool to about room temperature while maintaining the agitation. The system is then chilled to about 10° centigrade and the capsule wall material is chemically hardened by the addition of about 5 milliliters of 25 percent, by weight, aqueous glutaraldehyde solution.

EXAMPLE 8

In this example, a combination of the above-identified high, low, and medium molecular weight inorganic polymeric polyphosphate materials are utilized as the liquid-liquid phase-separation-inducing agent.

The following materials are combined: 100 milliliters of 10 percent, by weight, aqueous gelatin solution having a temperature of approximately 80° centigrade; 100 milliliters of water and 50 milliliters each of 25 percent, by weight, solutions of the above-identified "Hexatren N," "Hexatren R," and "Hexatren C-60" (all tradenames). The pH of the system is adjusted to about 6.8 and the temperature of the system is adjusted to about 35° centigrade. One hundred milliliters of toluene, the intended capsule internal phase for this example, is dispersed into the capsule manufacturing vehicle and the system is permitted to cool to about 25° centigrade. The system is then chilled to about 10° centigrade and the capsule wall material is chemically hardened by addition of about 5 milliliters of 37 percent, by weight, aqueous solution of formaldehyde and about 5 milliliters of 25 percent, by weight, aqueous glutaraldehyde solution.

Tests show that the encapsulating process of the present invention can be practiced using polyphosphate polymeric materials (for example, the above-identified tradenamed materials "Hexatren") in the pH range of approximately 5.5 to 7.5.

EXAMPLE 9

The following are added to a vessel equipped for agitation and heating: 100 milliliters of water: 100 milliliters of a 10 percent, by weight, aqueous solution of gelatin having a Bloom strength of 140 grams; and 200 milliliters of a 25 percent, by weight, aqueous solution of polyphosphate (the above-identified tradenamed material, "Hexatren C-60") all at a temperature of about 50° centigrade. The pH of the system is adjusted to about 5.5 and 50 milliliters of toluene, the intended internal phase material, is dispersed into the system. The system is permitted to cool to room temperature while maintaining the agitation. The system is then chilled to about 10° centigrade and the capsule wall material is chemicaly hardened by the addition of 5 milliliters of a 25 percent, by weight, solution of glutaraldehyde.

The capsular system is stirred overnight and the capsules are then filtered and dried on a forced air blower.

EXAMPLE 10

The following are added to a vessel equipped for agitation and heating: 100 milliliters of a 5 percent, by weight, aqueous solution of poly(vinyl alcohol) (for example, the material designated by the tradename "Elvanol 71-30" sold by E. I. duPont de Nemours and Co., Wilmington, Delaware, United States of America); 30 milliliters of toluene, the intended capsule internal phase material; 26 milliliters of 25 percent, by weight, aqueous solution of polyphosphate of the kind specified in Example 9, and 100 milliliters of water. Phase separation occurs on combination of the above. The poly(vinyl alcohol) is characterized by being 99 to 100 percent hydrolyzed, having a molecular weight of about 86,000 and having viscosity of about 28 to 32 centipoises in a 4 percent, by weight, aqueous solution at 20° centigrade. Under agitation, the system is chilled to a temperature of about 30 degrees centigrade and 30 milliliters of a 5 percent, by weight, aqueous resorcinol solution are added to stabilize the capsule walls. After agitation for another 30 minutes, 5 milliliters of a 10 percent, by volume, sulfuric acid and 10 milliliters of a 37 percent, by weight, aqueous formaldehyde solution are added. The resultant pH is about 2 and the agitation is continued for several hours.

EXAMPLE 11

Simple coacervation is accomplished and capsules are manufactured according to the aforedescribed examples by replacing the polyphosphates or polysilicates by molybdate materials, such as ammonium heptamolybdate in aqueous solution. The preferred pH for such an encapsulation is about 4.5 and care must be exercised to maintain a ratio of gelatin-to-inorganic material as hereinbefore designated to obtain simple coacervation.

EXAMPLE 12

Example 11 is repeated with the exceptions that polytungstates are substituted for the polymolybdates of that example and that the pH of operation is about 5. An eligible polytungstate, for instance, is sodium tungstate.

What is claimed is:

1. In a process for manufacturing minute capsules, en masse, in an aqueous liquid capsule manufacturing vehicle comprising the step of
   establishing an agitating three-phase aqueous liquid capsule manufacturing system wherein
   i. a major proportion of the system comprises a continuous phase of aqueous liquid, ii. a minor proportion of the system is a discontinuous phase of minute mobile particles of intended capsule core entities and, iii. a minor proportion of the system is a discontinuous phase of liquid globules of capsule wall material, the capsule core entities being wettable by the capsule wall material, the three phases being substantially mutually immiscible, and the liquid globules of capsule wall material being present in sufficient volume to wet and enwrap the capsule core entities and comprising two hydrophilic polymeric materials the improvement which comprises effecting establishment of the phase including capsule wall material by simple coacervation of poly(vinyl alcohol) concentrated in the capsule-wall-material-containing liquid phase using, as phase-separation-inducing material, an inorganic polymeric material wherein the inorganic polymeric material is selected from the group consisting of polyphosphates, polysilicates, polymolybdates, and polytungstates.

2. In a process for manufacturing minute capsules, en masse, including a simple coacervate of hydrophilic polymeric materials comprising the steps of: dissolving at least two hydrophilic polymeric materials in an aqueous manufacturing vehicle and adjusting conditions in the vehicle to yield an emergent liquid phase including a major portion of one of the hydrophilic polymeric materials the improvement which comprises utilizing an inorganic polymeric material as one hydrophilic polymeric material and utilizing poly(vinyl alcohol) as the remaining hydrophilic polymeric material;----said inorganic polymeric material being selected from the group consisting of polyphosphates, polysilicates, polymolybdates, and polytungstates and being present in substantially equal concentration in the emergent liquid phase and in the phase from which emergence occurred.

* * * * *